United States Patent
Hara et al.

(10) Patent No.: US 8,494,583 B2
(45) Date of Patent: Jul. 23, 2013

(54) ELECTRONIC APPARATUS, SCREEN INFORMATION OUTPUT METHOD AND COMPUTER-READABLE STORAGE MEDIUM

(75) Inventors: Yasushi Hara, Kawasaki (JP); Satoshi Kikuchi, Kawasaki (JP); Toshiya Miyazaki, Kawasaki (JP); Kazuyuki Takaki, Kawasaki (JP); Youichi Kondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/107,354

(22) Filed: May 13, 2011

(65) Prior Publication Data

US 2011/0217956 A1 Sep. 8, 2011

Related U.S. Application Data

(62) Division of application No. 11/272,745, filed on Nov. 15, 2005, now Pat. No. 7,974,656.

(30) Foreign Application Priority Data

Jun. 24, 2005 (JP) ................................ 2005-184449

(51) Int. Cl.
*H04B 1/38* (2006.01)

(52) U.S. Cl.
USPC ........ 455/557; 455/557.1; 455/445; 455/566; 455/444

(58) Field of Classification Search
USPC ................... 455/557, 557.1, 445, 566, 412.2, 455/412.1, 413, 444, 556.1, 415, 567, 411, 455/550.1, 456.3; 348/14.12, 173, 1.1, E7.081, 348/E7.078, 14.01, E5.127, E5.108, E5.093; 709/200, 206; 379/435
See application file for complete search history.

(56) References Cited

U.S. PATENT DOCUMENTS 6,032,025 A 2/2000 Sugio et al.
6,118,863 A 9/2000 Komuro et al.
(Continued)

FOREIGN PATENT DOCUMENTS

JP 2001-268181 9/2001
JP 2002-094665 3/2002
(Continued)

OTHER PUBLICATIONS

U.S. Office Action issued Feb. 14, 2008 in parent U.S. Appl. No. 11/272,745.

(Continued)

*Primary Examiner* — Joseph Arevalo
(74) *Attorney, Agent, or Firm* — Staas & Halsey LLP

(57) ABSTRACT

An electronic apparatus has a storage part to store a plurality of screen information, including incoming call screen information, a display part to display the screen information, and an output control part to output to an outside of the electronic apparatus arbitrary screen information that is to be output to the outside, of the screen information stored in the storage part, and to display the arbitrary screen information on the display part, when an external output function is set to an ON state. The output control part continues outputting the arbitrary screen information to the outside and displays on the display part the incoming screen information stored in the storage part, when an incoming call is received in a state where the external output function is set to the ON state.

7 Claims, 5 Drawing Sheets

U.S. PATENT DOCUMENTS

| | | | |
|---|---|---|---|
| 6,587,138 B1 | 7/2003 | Vogt et al. | |
| 6,931,265 B2 | 8/2005 | Reyes et al. | |
| 7,110,789 B1 * | 9/2006 | Curtiss et al. | 455/556.1 |
| 7,224,962 B1 * | 5/2007 | Kite | 455/412.1 |
| 7,257,398 B1 | 8/2007 | Ukita et al. | |
| 7,474,889 B2 | 1/2009 | Bhakta et al. | |
| 7,627,341 B2 * | 12/2009 | Wu | 455/556.1 |
| 7,963,542 B2 * | 6/2011 | Doll et al. | 280/404 |
| 2002/0043557 A1 | 4/2002 | Mizoguchi et al. | |
| 2002/0059024 A1 | 5/2002 | Ogaki | |
| 2002/0087555 A1 | 7/2002 | Murata | |
| 2003/0041048 A1 * | 2/2003 | Balasuriya | 707/1 |
| 2003/0211872 A1 | 11/2003 | Meins et al. | |
| 2004/0023656 A1 | 2/2004 | Purdy et al. | |
| 2004/0052360 A1 | 3/2004 | Tsai et al. | |
| 2004/0103153 A1 | 5/2004 | Chang et al. | |
| 2004/0107235 A1 | 6/2004 | Koskelainen | |
| 2004/0117409 A1 | 6/2004 | Scahill et al. | |
| 2004/0117804 A1 | 6/2004 | Scahill et al. | |
| 2004/0127254 A1 | 7/2004 | Chang | |
| 2004/0142724 A1 | 7/2004 | Buttet | |
| 2004/0174976 A1 * | 9/2004 | Elliott | 379/211.01 |
| 2004/0204135 A1 | 10/2004 | Zhao et al. | |
| 2004/0223049 A1 | 11/2004 | Taniguchi et al. | |
| 2005/0028221 A1 | 2/2005 | Liu et al. | |
| 2005/0036509 A1 | 2/2005 | Achary | |
| 2005/0068572 A1 | 3/2005 | Hart et al. | |
| 2005/0111644 A1 | 5/2005 | Edwards | |
| 2005/0120381 A1 | 6/2005 | Yamaguchi | |
| 2005/0186988 A1 | 8/2005 | Lim et al. | |
| 2005/0187706 A1 | 8/2005 | Ogaki | |
| 2006/0121940 A1 | 6/2006 | Kong et al. | |
| 2006/0194619 A1 * | 8/2006 | Wilcox et al. | 455/566 |
| 2006/0203758 A1 * | 9/2006 | Tee et al. | 370/315 |
| 2006/0223518 A1 * | 10/2006 | Haney | 455/420 |
| 2007/0049339 A1 | 3/2007 | Barak et al. | |
| 2008/0099563 A1 * | 5/2008 | Wormald et al. | 235/472.01 |
| 2011/0143722 A1 * | 6/2011 | Shaw et al. | 455/413 |

FOREIGN PATENT DOCUMENTS

| | | |
|---|---|---|
| JP | 2002-111802 | 4/2002 |
| JP | 2003-319097 | 11/2003 |
| JP | 2005-025582 | 1/2005 |
| JP | 2005-109828 | 4/2005 |
| JP | 2005-109844 | 4/2005 |

OTHER PUBLICATIONS

U.S. Office Action issued Sep. 30, 2008 in parent U.S. Appl. No. 11/272,745.

U.S. Office Action issued Mar. 3, 2009 in parent U.S. Appl. No. 11/272,745.

U.S. Office Action issued Dec. 11, 2009 in parent U.S. Appl. No. 11/272,745.

U.S. Office Action issued Apr. 14, 2010 in parent U.S. Appl. No. 11/272,745.

U.S. Office Action issued Sep. 29, 2010 in parent U.S. Appl. No. 11/272,745.

Notice of Allowance issued Mar. 4, 2011 in parent U.S. Appl. No. 11/272,745.

Japanese Office Action dated Jul. 13, 2009 issued in corresponding Japanese Application No. 2005-184449 (2 pages) (3 pages English Translation).

Japanese Office Action dated May 11, 2010 issued in corresponding Japanese Application No. 2005-184449 (1 page) (2 pages English Translation).

U.S. Appl. No. 11/272,745, filed Nov. 15, 2005, Yasushi Hara et al., Fujitsu Limited.

* cited by examiner

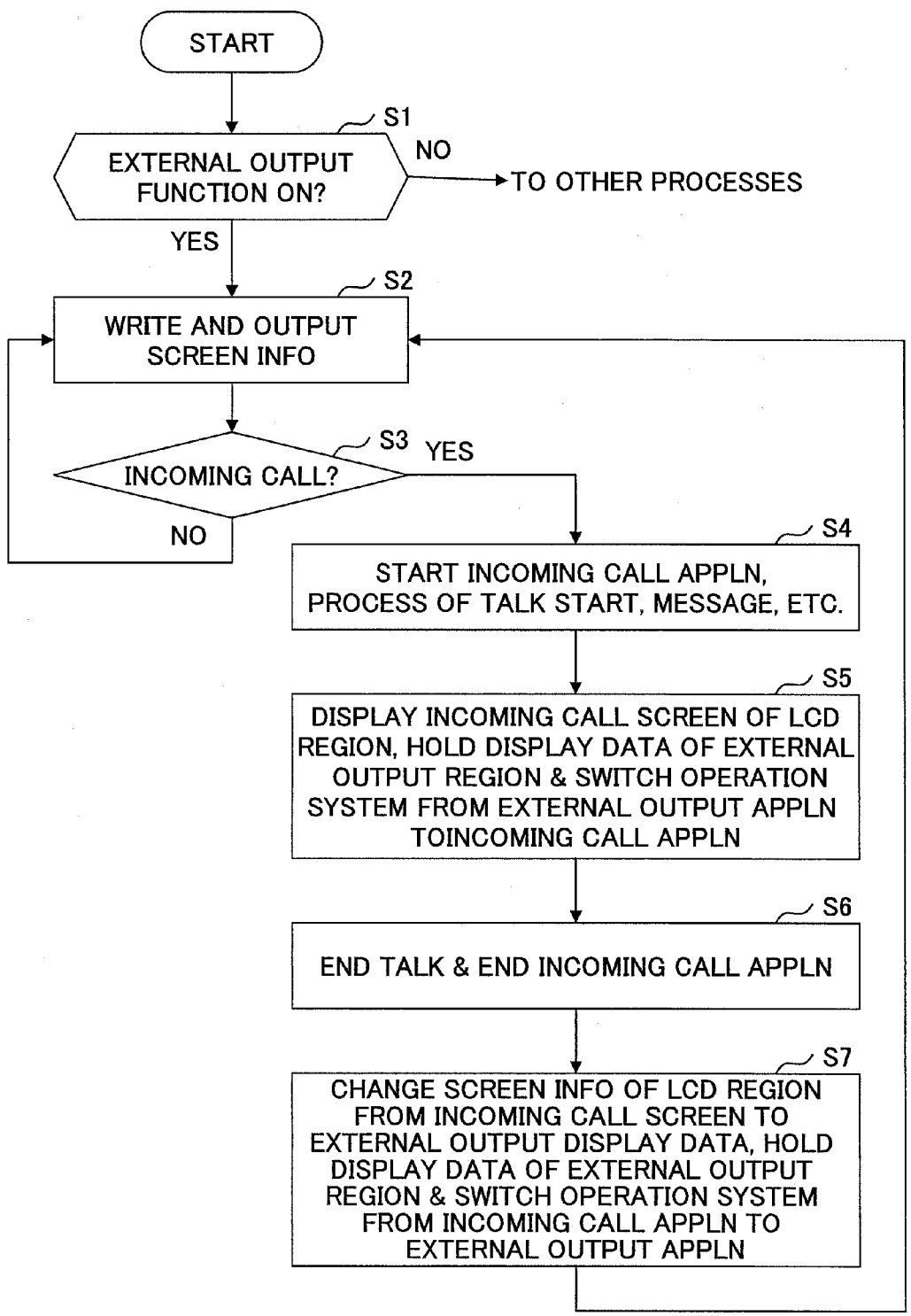

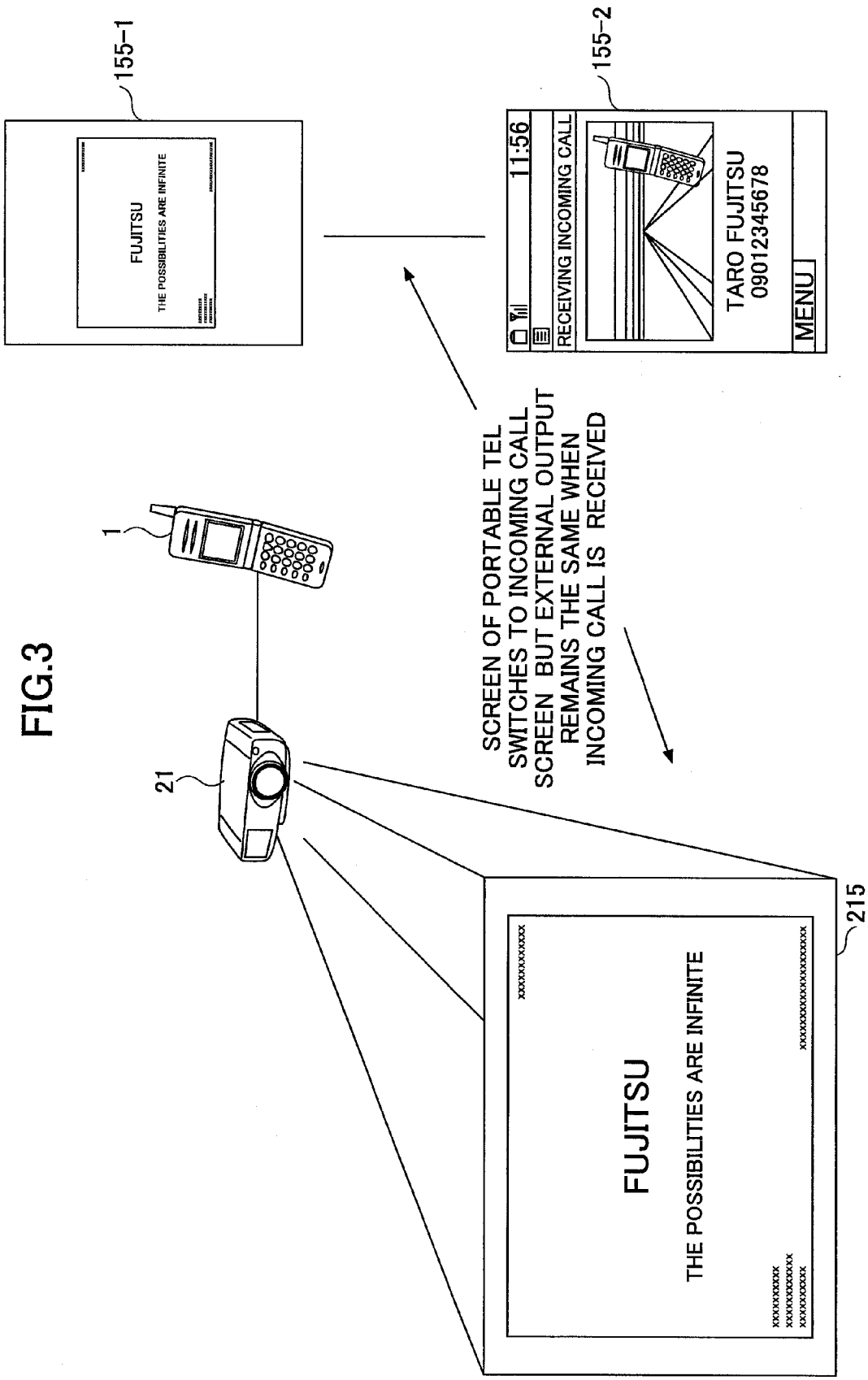

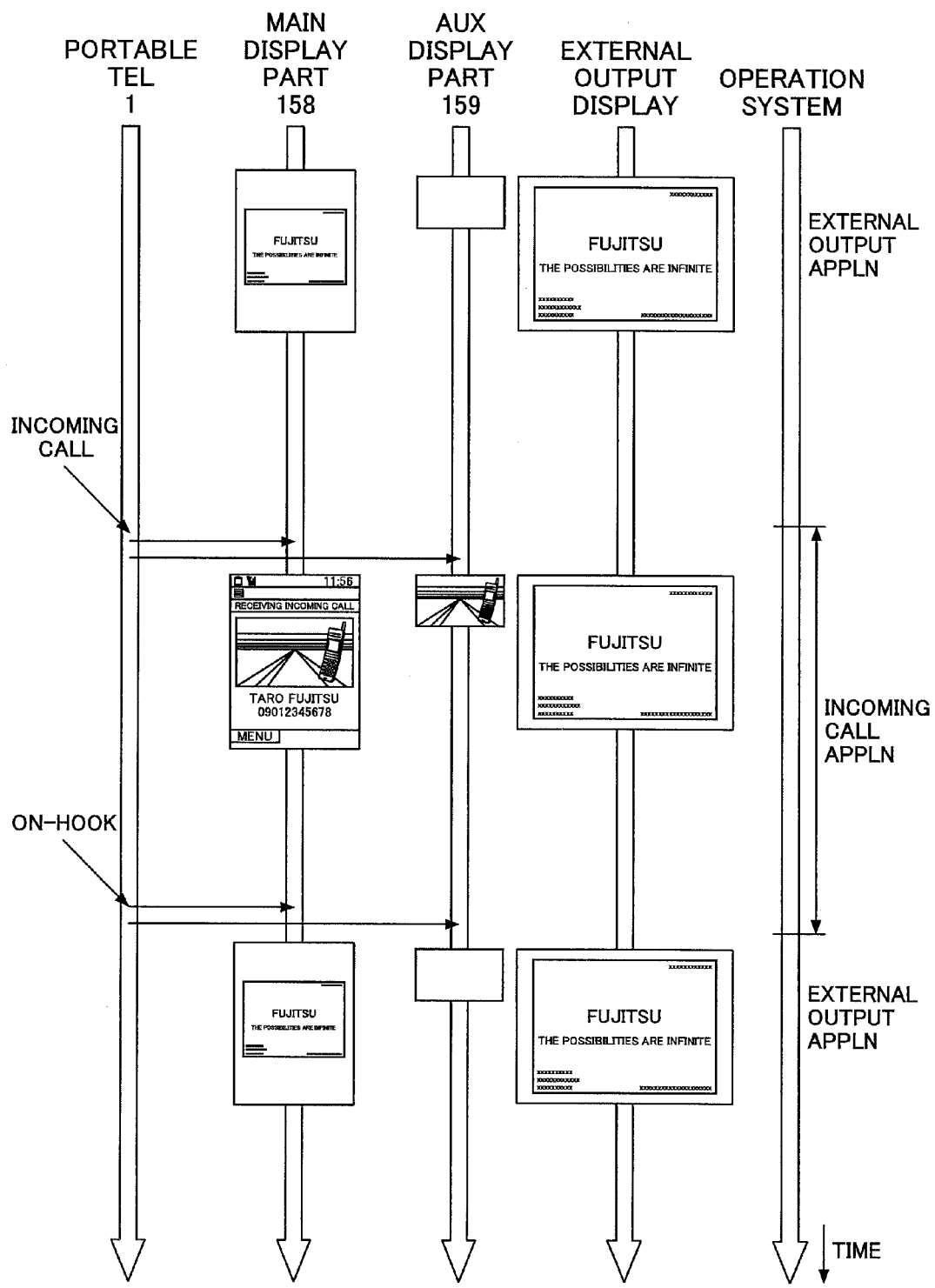

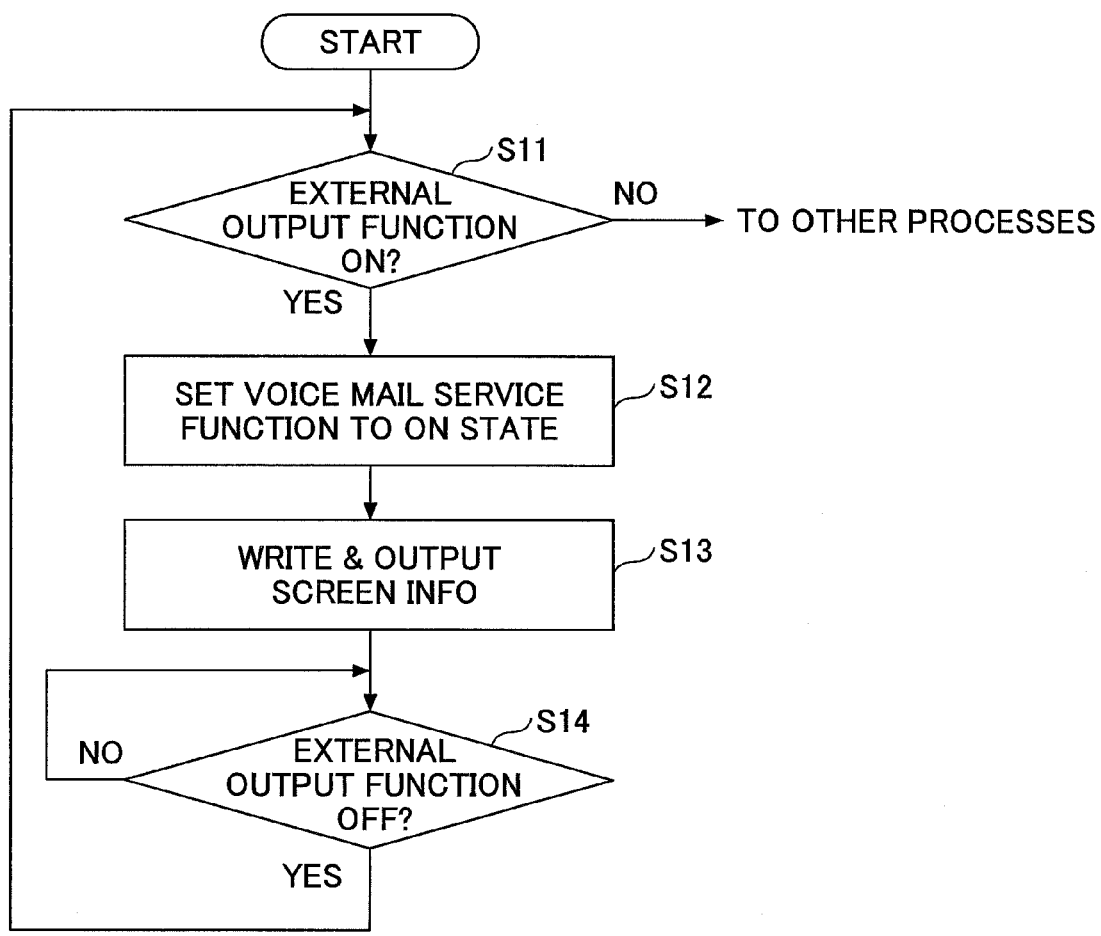

ELECTRONIC APPARATUS, SCREEN INFORMATION OUTPUT METHOD AND COMPUTER-READABLE STORAGE MEDIUM

This application is a divisional application of U.S. patent application Ser. No. 11/272,745, filed Nov. 15, 2005 now U.S. Pat. No. 7,974,656, the disclosure of which is herein incorporated in its entirety by reference. This application claims the priority benefit of Japanese Application No. 2005-184449, filed Jun. 24, 2005, the disclosure of which is herein incorporated in its entirety by reference.

BACKGROUND OF THE INVENTION

1. Field of the Invention

The present invention generally relates to electronic apparatuses, screen information output methods and computer-readable storage media, and more particularly to an electronic apparatus, such as a portable telephone, provided with a function of outputting to outside the electronic apparatus screen information that is to be displayed on a display part of the electronic apparatus, a screen information output method for outputting the screen information, and a computer-readable storage medium that stores a program for causing a computer to output the screen information.

2. Description of the Related Art

There are electronic apparatuses provided with a function of outputting to the outside the screen information that is to be displayed on the display part thereof. This function is used when the display part is relatively small as in the case of a portable electronic apparatus and the screen information is to be displayed on a monitoring apparatus or a large display part of an external information processing apparatus or, when the screen information is to be projected on a screen by a projector apparatus via the external information processing apparatus.

There also are portable telephones that are provided with the function of outputting to the outside the screen information that is to be displayed on the display part thereof. However, when there is an incoming call to the portable telephone while the portable telephone is displaying the screen information thereof on the monitoring apparatus or the like, the output of the screen information to the outside is stopped, so as to prevent the incoming call screen of the portable telephone from being displayed on the monitoring apparatus or the like. The telephone number of the caller is displayed on the incoming call screen of the portable telephone, and if this telephone number of the caller is registered in a telephone directory within the portable telephone, the user name or the like of this caller is also displayed on the incoming call screen. Hence, from the point of view of protecting personal or private information, it is necessary to prevent the incoming call screen from being carelessly displayed to a third party. In addition, when the incoming call screen of the portable telephone is customized by the user, it is also desirable to prevent the personal and customized incoming call screen from being carelessly displayed to a third party.

A Japanese Laid-Open Patent Application No. 2002-111802 proposes a portable telephone having a function of displaying information, and a Japanese Laid-Open Patent Application No. 2003-319097 proposes a graphic distribution system for two linked screens.

But when there is an incoming call to the portable telephone while making a presentation or the like to the customer by outputting the screen information of the portable telephone to the outside and displaying the screen information on the monitoring apparatus or the like, the presentation or the like will be interrupted because the output of the screen information to the monitoring apparatus or the like will be stopped. In other words, when there is an incoming call while the portable telephone is outputting the screen information thereof to the external monitoring apparatus or the like and the screen information is being displayed on the external monitoring apparatus or the like, there was a problem in that the display of the external monitoring apparatus or the like is stopped immediately.

If the display of the monitoring apparatus or the like is stopped without notice while making the presentation or the like to the customer when there is an incoming call to the portable telephone, it may make a bad impression to the customer.

SUMMARY OF THE INVENTION

Accordingly, it is a general object of the present invention to provide a novel and useful electronic apparatus, screen information output method and computer-readable storage medium, in which the problems described above are suppressed.

Another and more specific object of the present invention is to provide an electronic apparatus, a screen information output method and a computer-readable storage medium, which can continue to output to the outside screen information other than the incoming call screen information of the electronic apparatus, even when there is an incoming call to the electronic apparatus while outputting the screen information of the electronic apparatus to the outside.

Still another object of the present invention is to provide an electronic apparatus comprising a storage part configured to store a plurality of screen information, including incoming call screen information; a display part configured to display the screen information; and an output control part configured to output to an outside of the electronic apparatus arbitrary screen information that is to be output to the outside, of the screen information stored in the storage part, and to display the arbitrary screen information on the display part, when an external output function is set to an ON state, wherein the output control part continues outputting the arbitrary screen information to the outside and displays on the display part the incoming screen information stored in the storage part, when an incoming call is received in a state where the external output function is set to the ON state. According to the electronic apparatus of the present invention, it is possible to continue outputting to the outside the screen information other than the incoming call screen information of the electronic apparatus, even when there is an incoming call to the electronic apparatus while outputting the screen information of the electronic apparatus to the outside.

A further object of the present invention is to provide an electronic apparatus comprising a storage part configured to store a plurality of screen information, including incoming call screen information; a display part configured to display the screen information; and an output control part configured to output to an outside of the electronic apparatus arbitrary screen information that is to be output to the outside, of the screen information stored in the storage part, and to display the arbitrary screen information on the display part, when an external output function is set to an ON state, wherein the output control part automatically sets a voice mail service function to an ON state when the external output function is set to the ON state, so that the electronic apparatus behaves as if the electronic apparatus were out of communication range and an incoming call is received by a voice mail service center in place of the electronic apparatus when the voice mail service function is set to the ON state. According to the electronic apparatus of the present invention, it is possible to continue outputting to the outside the screen information other than the incoming call screen information of the electronic apparatus, even when there is an incoming call to the electronic apparatus while outputting the screen information of the electronic apparatus to the outside.

Another object of the present invention is to provide a screen information output method for outputting screen information from an electronic apparatus having a display part and a storage part, comprising a display step displaying on the display part a plurality of screen information stored in the storage part, including an incoming call screen information; and an output control step outputting to an outside of the electronic apparatus arbitrary screen information that is to be output to the outside, of the screen information stored in the storage part, and displaying the arbitrary screen information on the display part, when an external output function is set to an ON state, wherein the output control step continues outputting the arbitrary screen information to the outside and displays on the display part the incoming screen information stored in the storage part, when an incoming call is received in a state where the external output function is set to the ON state. According to the screen output method of the present invention, it is possible to continue outputting to the outside the screen information other than the incoming call screen information of the electronic apparatus, even when there is an incoming call to the electronic apparatus while outputting the screen information of the electronic apparatus to the outside.

Still another object of the present invention is to provide a screen information output method for outputting screen information from an electronic apparatus having a display part and a storage part, comprising a display step displaying on the display part a plurality of screen information stored in the storage part, including an incoming call screen information; and an output control step outputting to an outside of the electronic apparatus arbitrary screen information that is to be output to the outside, of the screen information stored in the storage part, and displaying the arbitrary screen information on the display part, when an external output function is set to an ON state, wherein the output control step automatically sets a voice mail service function to an ON state when the external output function is set to the ON state, so that the electronic apparatus behaves as if the electronic apparatus were out of communication range and an incoming call is received by a voice mail service center in place of the electronic apparatus when the voice mail service function is set to the ON state. According to the screen information output method of the present invention, it is possible to continue outputting to the outside the screen information other than the incoming call screen information of the electronic apparatus, even when there is an incoming call to the electronic apparatus while outputting the screen information of the electronic apparatus to the outside.

A further object of the present invention is to provide a computer-readable storage medium storing a program for causing a computer to output screen information, the program comprising a display procedure causing the computer to display on a display part a plurality of screen information stored in a storage part, including an incoming call screen information; and an output control procedure causing the computer to output to an outside of the computer arbitrary screen information that is to be output to the outside, of the screen information stored in the storage part, and to display the arbitrary screen information on the display part, when an external output function is set to an ON state, wherein the output control procedure causes the computer to continue outputting the arbitrary screen information to the outside and to display on the display part the incoming screen information stored in the storage part, when an incoming call is received in a state where the external output function is set to the ON state. According to the computer-readable storage medium of the present invention, it is possible to continue outputting to the outside the screen information other than the incoming call screen information of the computer, even when there is an incoming call to the computer while outputting the screen information of the computer to the outside.

Another object of the present invention is to provide a computer-readable storage medium storing a program for causing a computer to output screen information, the program comprising a display procedure causing the computer to display on a display part a plurality of screen information stored in a storage part, including an incoming call screen information; and an output control procedure causing the computer to output to an outside of the computer arbitrary screen information that is to be output to the outside, of the screen information stored in the storage part, and to display the arbitrary screen information on the display part, when an external output function is set to an ON state, wherein the output control procedure causes the computer to automatically set a voice mail service function to an ON state when the external output function is set to the ON state, so that the computer behaves as if the computer were out of communication range and an incoming call is received by a voice mail service center in place of the computer when the voice mail service function is set to the ON state. According to the computer-readable storage medium of the present invention, it is possible to continue outputting to the outside the screen information other than the incoming call screen information of the computer, even when there is an incoming call to the computer while outputting the screen information of the computer to the outside.

Other objects and further features of the present invention will be apparent from the following detailed description when read in conjunction with the accompanying drawings.

BRIEF DESCRIPTION OF THE DRAWINGS

FIG. 2 is a flow chart for explaining an operation of the first embodiment of the electronic apparatus;

FIG. 3 is a diagram for explaining screen information of the first embodiment of the electronic apparatus;

FIG. 4 is a time chart for explaining an operation of a second embodiment of the electronic apparatus according to the present invention; and FIG. 5 is a flow chart for explaining an operation of a third embodiment of the electronic apparatus according to the present invention.

DESCRIPTION OF THE PREFERRED EMBODIMENTS

Figure 1:
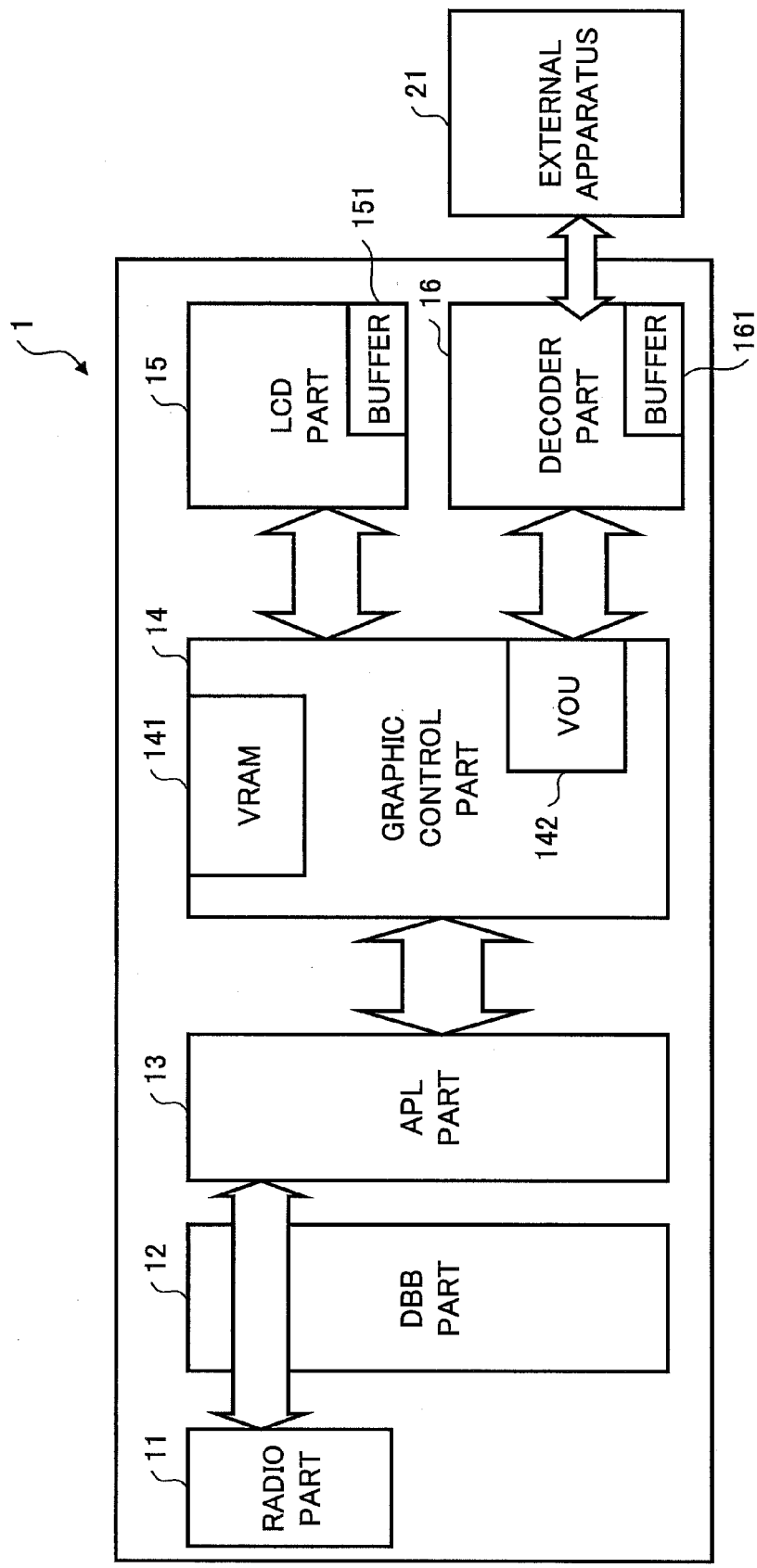
FIG. 1 is a system block diagram showing a structure of an important part of a first embodiment of the electronic apparatus according to the present invention.

A description will be given of embodiments of the electronic apparatus, the screen information output method and the computer-readable storage medium according to the present invention, by referring to the drawings.

FIG. 1 is a system block diagram showing the structure of the important part of the first embodiment of the electronic apparatus according to the present invention. This first embodiment of the electronic apparatus employs a first embodiment of the screen information output method according to the present invention and a first embodiment of the computer-readable storage medium according to the present invention. In this embodiment, the present invention is applied to a portable telephone, however, the present invention is of course similarly applicable to various kinds of electronic apparatuses, such as a PDA, that are provided with the function of outputting the screen information to the outside of the electronic apparatus. Further, it is not essential for the electronic apparatus to be portable.

In FIG. 1, a portable telephone 1 includes a radio part 11, a digital base band (DBB) part 12, an application executing (APL) part 13, a graphic control part 14, an LCD part 15, and a decoder part 16. The APL part 13 is formed by a processor (not shown) such as a CPU, and a memory (not shown), and the processor executes various applications that are stored in the memory. The graphic control part 14 includes a video random access memory (VRAM) 141 forming a storage part or (storage means) that is capable of storing a plurality of screen information, and a video out unit (VOU) 142 that outputs the screen information. The LCD part 15 includes a buffer 151, and the decoder part 16 includes a buffer 161. In this embodiment, the LCD part 15 is formed by a touch panel, and an input part (or input means) such as a keyboard and a display part (or display means) are integrally provided in the LCD part 15. However, in a case where the LCD part 15 does not include an input part (or input means), an input part (or input means) such as the keyboard may be provided separately and connected to the APL part 13.

The radio part 11 includes a transmitting part which makes a transmission by a known method and a receiving part which makes a reception by a known method. The DBB part 12 is formed by a known baseband chip that includes the functions of processing an output of a speech input part of the portable telephone 1, which includes a microphone and the like, into a format suited for transmission via the radio part 11, and processing information received via the radio part 11 into a format suited for input to a speech output part of the portable telephone 1, which includes a speaker and the like. The APL part 13 is formed by a known application chip that executes various applications such as a transmitting application, an incoming call application, an external output application and the like of the portable telephone 1. The APL part 13 forms an application executing part (or application executing means). The graphic control part 14 supplies to the LCD part 15 and displays on a display part screen information that is received, screen information that is picked up by a camera (not shown) of the portable telephone 1 and transmitted, screen information stored in the VRAM 141 and the like. The LCD part 15 temporarily stores the screen information supplied from the graphic control part 14 in the buffer 151, and displays the screen information on the display part. In addition, the graphic control part 14 supplies the screen information stored in the VRAM 141 to the decoder part 16 via the VOU 142, when the external output function is set to the ON state and the external output application is started. The decoder part 16 temporarily stores the screen information supplied thereto via the VOU 142 in the buffer 161, processes the screen information into a format suited for display by an external apparatus 21, and supplies the processed screen information to the external apparatus 21 via an output port (not shown). The graphic control part 15 and the decoder part 16 form an output control part (or output control means) together with the processor of the portable telephone 1.

The decoder part 16 of the portable telephone 1 is connected to the external apparatus 21 via the output port by cable and/or radio (wireless). The external apparatus 21 is formed by a monitoring apparatus, for example. The monitoring apparatus may be formed by an information processing apparatus having a display part, such as a personal computer that has a known structure. Of course, the external apparatus 21 that is connected to the portable telephone 1 is not limited to the monitoring apparatus 21, and other apparatus, such as a projector apparatus, may be connected to the portable telephone as the external apparatus 21. The screen information that is output from the portable telephone 1 to the outside of the portable telephone 1 is displayed on the display part of the monitoring apparatus if the external apparatus 21 is formed by the monitoring apparatus. The screen information that is output from the portable telephone 1 to the outside of the portable telephone 1 is displayed on a screen or the like by the projector apparatus if the external apparatus 21 is formed by the projector apparatus.

The screen information that is displayed on the display part of the LCD part 15 within the portable telephone 1 and the screen information that is output from the decoder part 16 within the portable telephone 1 to the outside of the portable telephone 1 may respectively include still image information, dynamic image information or, both the still image information and the dynamic image information. Moreover, in this embodiment, the screen information that is output from the decoder part 16 to the external apparatus 21 via the output port is a video signal in conformance with the NTSC system, for example, but the screen information that is output to the external apparatus 21 may be a video signal in conformance with other systems or an RGB signal.

Of course, the basic structure of the portable telephone 1 is not limited to that shown in FIG. 1.

FIG. 2 is a flow chart for explaining the operation of this first embodiment of the electronic apparatus. The process shown in FIG. 2 is carried out when the processor within the portable telephone 1 executes a program stored in this first embodiment of the computer-readable storage medium. In FIG. 2, a step S1 decides whether or not the external output function is set to the ON state. When the user of the portable telephone 1 selects the external output function from the input part of the LCD part 15, the external output function is set to the ON state, and the external output application is started, thereby making the decision result in the step S1 YES and advancing the process to a step S2. On the other hand, if the decision result in the step S1 is NO, the process advances to other processes of the portable telephone 1 that are not directly related to the subject matter of the present invention.

The step S2 writes the screen information that is stored in an LCD region of the VRAM 141 within the graphic control part 14 and is to be output to the outside the portable telephone 1 into an external output region which is different from the LCD region of the VRAM 141, in response to an instruction from the input part of the LCD part 15. Hence, the screen information that is stored in the LCD region of the VRAM 141 and is to be output to the outside is displayed on the display part of the LCD part 15, and the same screen information that is stored in the external output region of the VRAM 141 is output via the decoder part 16 to the outside of the portable telephone 1. In this state, an operation system of the portable telephone 1 (input or instruction that is made by operating the input part of the LCD part 16) is processed by the external output application.

A step S3 decides whether or not there is an incoming call to the portable telephone 1. The process returns to the step S2 if the decision result in the step S3 is NO. On the other hand, if the decision result in the step S3 is YES, a step S4 starts the incoming call application, and carries out a known process such as receiving messages from a voicemail service center if a talk is started or a voice mail service is used in response to an operation made from the input part of the LCD part 15. A step S5 displays on the display part of the LCD part 15 the screen information of the incoming call screen that is stored in the LCD region of the VRAM 141 under the control of the incoming call application, and also outputs to the outside of the portable telephone 1 via the decoder part 16 the screen information that is stored in the external output region of the VRAM 141 and is to be output to the outside under the control of the external output application. In this state, the operation system of the portable telephone 1 has been switched from the external output application to the incoming call application, and the operation system of the portable telephone 1 is processed by the incoming call application. A step S6 ends the talk in response to an on-hook at the caller end or the operation from the input part of the LCD part 15, and ends the incoming call application.

A step S7 switches the output from the graphic control part 14 to the LCD part 15 from the screen information of the incoming call screen stored in the LCD region of the VRAM 141 to the screen information that is to be output to the outside of the portable telephone 1 and is stored in the LCD region of the VRAM 141, under the control of the external output application, and displays the screen information that is to be output on the display part of the LCD part 15. At the same time, the step S7 outputs to the outside of the portable telephone 1, via the decoder part 16, the screen information that is to be output and is stored in the external output region of the VRAM 141. In this state, the operation system of the portable telephone 1 has been switched from the incoming call application to the external output application, and the operation system of the portable telephone 1 is processed by the external output application. After the step S7, the process returns to the step S2.

A switching process which switches the operation system of the portable telephone 1 between the external output application and the incoming call application may be carried out by the processor of the portable telephone 1 or, by the graphic control part 14. In other words, the processor of the portable telephone 1 or the graphic control part 14 forms a switching part (or switching means) that carries out the switching process.

FIG. 3 is a diagram for explaining the screen information of the first embodiment of the electronic apparatus. For the sake of convenience, FIG. 3 shows a case where the projector apparatus is connected, as the external apparatus 21, to the portable telephone 1. The right portion of FIG. 3 shows a display screen 155-1 that is displayed on the display part of the LCD part 15 in a state where the operation system of the portable telephone 1 is processed by the external output application, and a display screen 155-2 that is displayed on the display part of the LCD part 15 in a state where the operation system is switched to the incoming application in response to the incoming call to the portable telephone 1. On the other hand, the left portion of FIG. 3 shows a display screen 215 that is output from the portable telephone 1 and is projected on the screen or the like by the protector apparatus 21, and this display screen 215 is not switched like the display screen that is displayed on the display part of the LCD part 15 of the portable telephone 1, even if the operation system of the portable telephone 1 is switched from the external output application to the incoming call application.

Accordingly, the output of the screen information to the external apparatus 21 will not be switched when there is an incoming call to the portable telephone 1, and in addition, it is possible to prevent the incoming call screen of the portable telephone 1 from being output to the external apparatus 21 and displayed. The telephone number of the caller is displayed on the incoming call screen of the portable telephone 1, and if this telephone number of the caller is registered in a telephone directory within the portable telephone 1, the user name or the like of this caller is also displayed on the incoming call screen. Hence, from the point of view of protecting personal or private information, it is advantageous to prevent the incoming call screen from being carelessly displayed to a third party. In addition, when the incoming call screen of the portable telephone 1 is customized by the user, it is also advantageous to prevent the personal and customized incoming call screen from being carelessly displayed to a third party.

The screens that are displayed in the portable telephone 1 includes, in addition to the incoming call screen that is displayed when there is an incoming call to the portable telephone 1, a response hold screen, a voice mail screen, a bar incoming call screen, a call forwarding screen and the like. Since the response hold screen, the voice mail screen, the bar incoming call screen, the call forwarding screen and the like are displayed after the portable telephone 1 receives an incoming call, that is, after the incoming call screen is displayed, the corresponding response hold application, voice mail application, bar incoming call application, call forwarding application and the like may be regarded as being a portion of the incoming call application. Therefore, similarly as in the case of the incoming call screen, the response hold screen, the voice mail screen, the bar incoming call screen, the call forwarding screen and the like will not be output to the outside of the portable telephone 1, even when the external output function is set to the ON state.

FIG. 3 shows a case where LCD part 15 of the portable telephone 1 does not include the input part, and the keyboard (or key pad) forming the input part is provided separately from the display part of the LCD part 15.

FIG. 4 is a time chart for explaining the operation of a second embodiment of the electronic apparatus according to the present invention. This second embodiment of the electronic apparatus employs a second embodiment of the screen information output method according to the present invention and a second embodiment of the computer-readable storage medium according to the present invention. The basic structure of this second embodiment of the electronic apparatus is similar to that of the first embodiment shown in FIG. 1, but in this second embodiment, the LCD part 15 includes a main display part and an auxiliary display part. The main display part has a display region larger than that of the auxiliary display part. In a case where the portable telephone 1 is a folding type, the main display part is provided at a position such that the main display part is visible in a state where a lid of the portable telephone 1 is open (for example, the state shown in FIG. 3), and the auxiliary display part is provided at a position such that the auxiliary display part is visible even in a state where the lid of the portable telephone 1 is closed, such as a back surface of the portable telephone 1 or the lid. The main display part corresponds to the display part of the first embodiment described above, and the auxiliary display part is used to display auxiliary information and screens.

FIG. 4 shows the external output display that is displayed by the external apparatus 21 and the state of the operation system of the portable telephone 1, when the screen information of the portable telephone 1, a main display part 158 of the LCD part 15 and an auxiliary display part 159 of the LCD part 15 is output to the outside of the portable telephone 1 to the external apparatus 21.

In a state where the external output function of the portable telephone 1 is set to the ON state and the operation system is processed by the external output application, the contents of the main display part 158 and the external output display are the same, and no information is displayed in particular on the auxiliary display part 159 in this embodiment. When there is an incoming call to the portable telephone 1 and a switch is made to the state where the operation system is processed by the incoming call application, the contents of the external output display do not change, by the incoming call screen is displayed on the main display part 158, and a simplified incoming call screen that indicates the incoming call is displayed on the auxiliary display part 159. In this state, the portable telephone 1 carries out the process at the time of the incoming call, such as the response hold, voice mail, bar incoming call, call forwarding and the like, until the on-hook state occurs. If the portable telephone 1 assumes the on-hook state, a switch is made to the state where the operation system is processed by the external output application. As a result, the contents of the main display part 158 and the external output display become the same, and no information is displayed in particular on the auxiliary display part 159 in this embodiment.

The use of the tone, the use and the kind of vibrator, the use of display of the auxiliary display part 159 and the like at the time when an incoming call is received by the portable telephone 1 in the state where the external output function thereof is set to the ON state, may be settable independently of the use of the tone, the use and the kind of vibrator, the use of display of the auxiliary display part 159 and the like at the time when the incoming call is received by the portable telephone 1 in the state where the external output function is set to the OFF state.

Next, a description will be given of a third embodiment of the electronic apparatus according to the present invention, by referring to FIG. 5. This third embodiment of the electronic apparatus employs a third embodiment of the screen information output method according to the present invention and a third embodiment of the computer-readable storage medium according to the present invention. FIG. 5 is a flow chart for explaining the operation of this third embodiment of the electronic apparatus. The process shown in FIG. 5 is carried out when the processor within the portable telephone 1 executes a program stored in this third embodiment of the computer-readable storage medium. The basic structure of this third embodiment of the electronic apparatus may be the same as that of the first embodiment shown in FIG. 1.

In FIG. 5, a step S11 decides whether or not the external output function is set to the ON state. When the user of the portable telephone 1 selects the external output function from the input part of the LCD part 15, the external output function is set to the ON state, and the external output application is started, thereby making the decision result in the step S11 YES and advancing the process to a step S12. On the other hand, if the decision result in the step S11 is NO, the process advances to other processes of the portable telephone 1 that are not directly related to the subject matter of the present invention.

The step S12 automatically sets the voice mail service function of the portable telephone 1 to the ON state. When the voice mail service function is set to the ON state, the incoming call to the portable telephone 1 is received by a voice mail service center (not shown) in place of the portable telephone 1, and messages from the caller end are recorded by a known method. The messages recorded at the voice mail service center may be received (or reproduced) by a known method, by making inquiry from the portable telephone 1 to the voice mail service center. When the voice mail service function of the portable telephone 1 is set to the ON state, the portable telephone 1 behaves as if the portable telephone 1 were out of communication range, and the portable telephone 1 will not actually assume an arrival call state and will not carry out an arrival call act.

A step S13 writes the screen information that is stored in the LCD region of the VRAM 141 within the graphic control part 14 and is to be output to the outside the portable telephone 1 into the external output region of the VRAM 141, in response to an instruction from the input part of the LCD part 15. Hence, the screen information that is stored in the LCD region of the VRAM 141 and is to be output to the outside is displayed on the display part of the LCD part 15, and the same screen information that is stored in the external output region of the VRAM 141 is output via the decoder part 16 to the outside of the portable telephone 1. In this state, the operation system of the portable telephone 1 (input or instruction that is made by operating the input part of the LCD part 16) is processed by the external output application.

A step S14 decides whether or not the voice mail service function of the portable telephone 1 is set to the OFF state. When the user of the portable telephone 1 sets the external output function to the OFF state from the input part of the LCD part 15, the decision result in the step S14 becomes YES, and the process returns to the step S11.

According to this third embodiment, the voice mail service function of the portable telephone 1 is automatically set to the ON state when the external output function of the portable telephone 1 is set to the ON state. For this reason, the portable telephone 1 itself does not receive an incoming call while the external output function of the portable telephone 1 is being used, and the incoming call screen or the like will not be output to the outside of the portable telephone 1.

Of course, the portable telephone 1 may be constructed so that the function (or mode) of the first embodiment or the second embodiment or, the function (or mode) of the third embodiment is selectable based on an instruction that is input from the input part.

The computer-readable storage medium according to the present invention stores the program that causes the processor such as the CPU, that is, the computer, to output the screen information by to the screen information output method according to the present invention. This program may be downloaded from another computer via a network or, stored in a recording medium. Various kinds of recording media capable of storing the program in a computer-readable manner may be used for the computer-readable storage medium, such as magnetic recording media, optical recording media, magneto-optical recording media, and semiconductor memory devices.

This application claims the benefit of a Japanese Patent Application No. 2005-184449 filed Jun. 24, 2005, in the Japanese Patent Office, the disclosure of which is hereby incorporated by reference.

Further, the present invention is not limited to these embodiments, but various variations and modifications may be made without departing from the scope of the present invention.

What is claimed is:
1. An electronic apparatus comprising:
a storage part configured to store a plurality of screen information, including incoming call screen information,
a display part configured to display the screen information; and
an output control part configured to output to an outside of the electronic apparatus arbitrary screen information that is to be output to the outside and is stored in the storage part, and to display the arbitrary screen information on the display part, when an external output function is set to an ON state, wherein the output control part automatically sets a voice mail service function to an ON state when the external output function is set to the ON state, so that the electronic apparatus behaves as if the electronic apparatus were out of communication range and an incoming call is received by a voice mail service center in place of the electronic apparatus when the voice mail service function is set to the ON state.

2. The electronic apparatus as claimed in claim 1, wherein the output part outputs the arbitrary screen information to an external apparatus that is external to and is connectable to the electronic apparatus.

3. The electronic apparatus as claimed in claim 2, wherein the output control part includes a decoder part configured to process the arbitrary screen information into a format suited for display by the external apparatus to which the arbitrary screen information is output.

4. The electronic apparatus as claimed in claim 1, further comprising:
   an input part:
   an application executing part configured to execute a plurality of applications, including an external output application and an incoming call application; and
   a switching part configured to carry out a switching process to switch the applications so that an input or an instruction made by an operation of the input part is processed by the external output application in the state where the external output function is set to the ON state, by the incoming call application when the incoming call is received by the electronic apparatus, and by the external output application after the communication for the incoming call is ended.

5. A non-transitory computer-readable storage medium which stores a program which, when executed by a computer, causes the computer to perform a process comprising:
   a display procedure causing the computer to display on a display part a plurality of screen information stored in a storage part, including an incoming call screen information; and
   an output control procedure causing the computer to output an outside of the computer arbitrary screen information that is to be output to the outside, amongst the screen information stored in the storage part, and to display the arbitrary screen information on the display part, when an external output function is set to an ON state, wherein the output control procedure causes the computer to automatically set a voice mail service function to an ON state when the external output function is set to the ON state, so that the computer behaves as if the computer were out of communication range and an incoming call is received by a voice mail service center in place of the computer when the voice mail service function is set to the ON state.

6. The non-transitory computer-readable storage medium as claimed in claim 5, wherein the output control procedure processes the arbitrary screen information, using a decoder part, into a format suited for display by an external apparatus to which the arbitrary screen information is output.

7. The non-transitory computer-readable storage medium as claimed in claim 5, wherein the incoming call is received from a communication apparatus other than the external apparatus which receives the arbitrary screen information output from the computer by the output control procedure.

* * * * *